Aug. 25, 1964 R. W. JENNY ETAL 3,145,954
VEHICLE FOR NON-AIR, SEMI-AIR, AND
FULL-AIR SUPPORTED TRAVEL
Filed March 7, 1962 4 Sheets-Sheet 1

INVENTORS
ROBERT W. JENNY
ROBERT O. LEWIS, Jr.
BY
Roy Mattern Jr.
Att'y

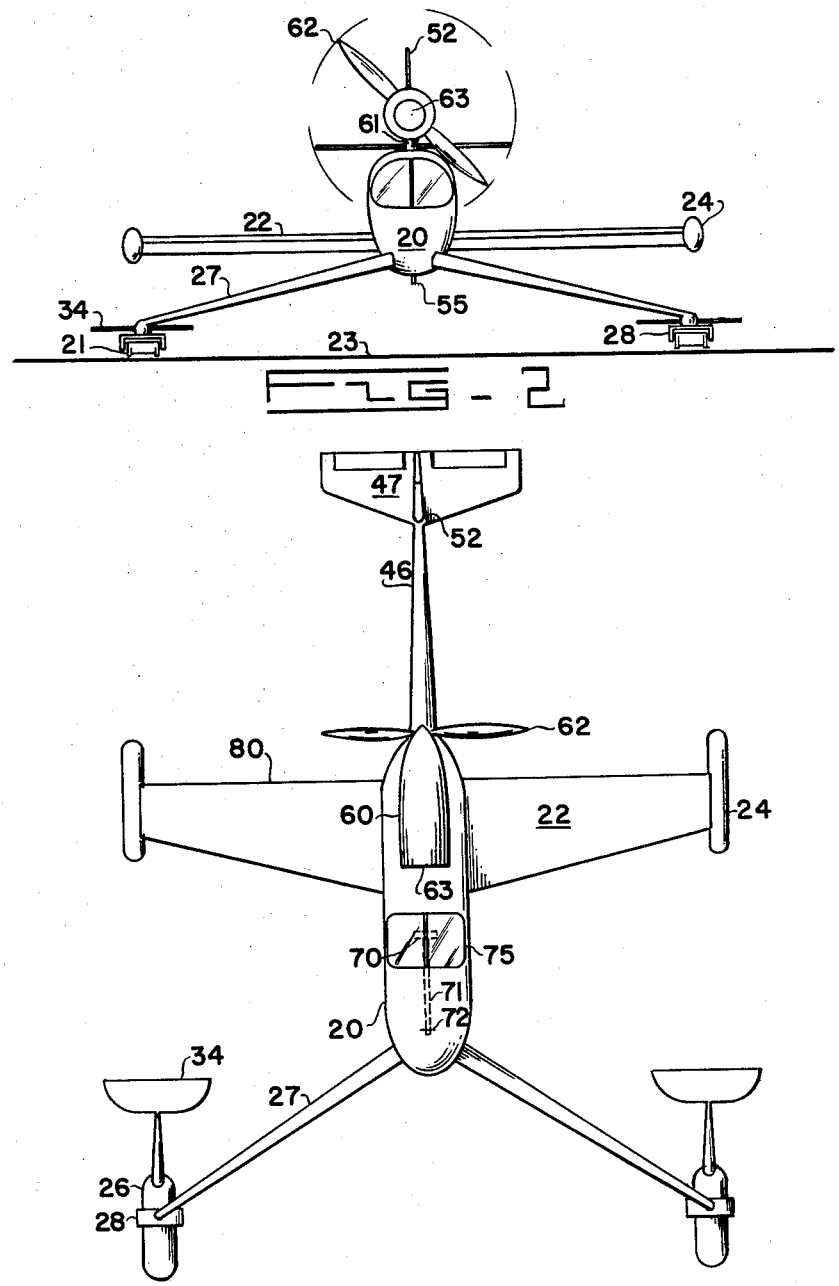

INVENTORS
ROBERT W. JENNY
ROBERT O. LEWIS, Jr.
BY
Roy Mattern Jr.
Att'y

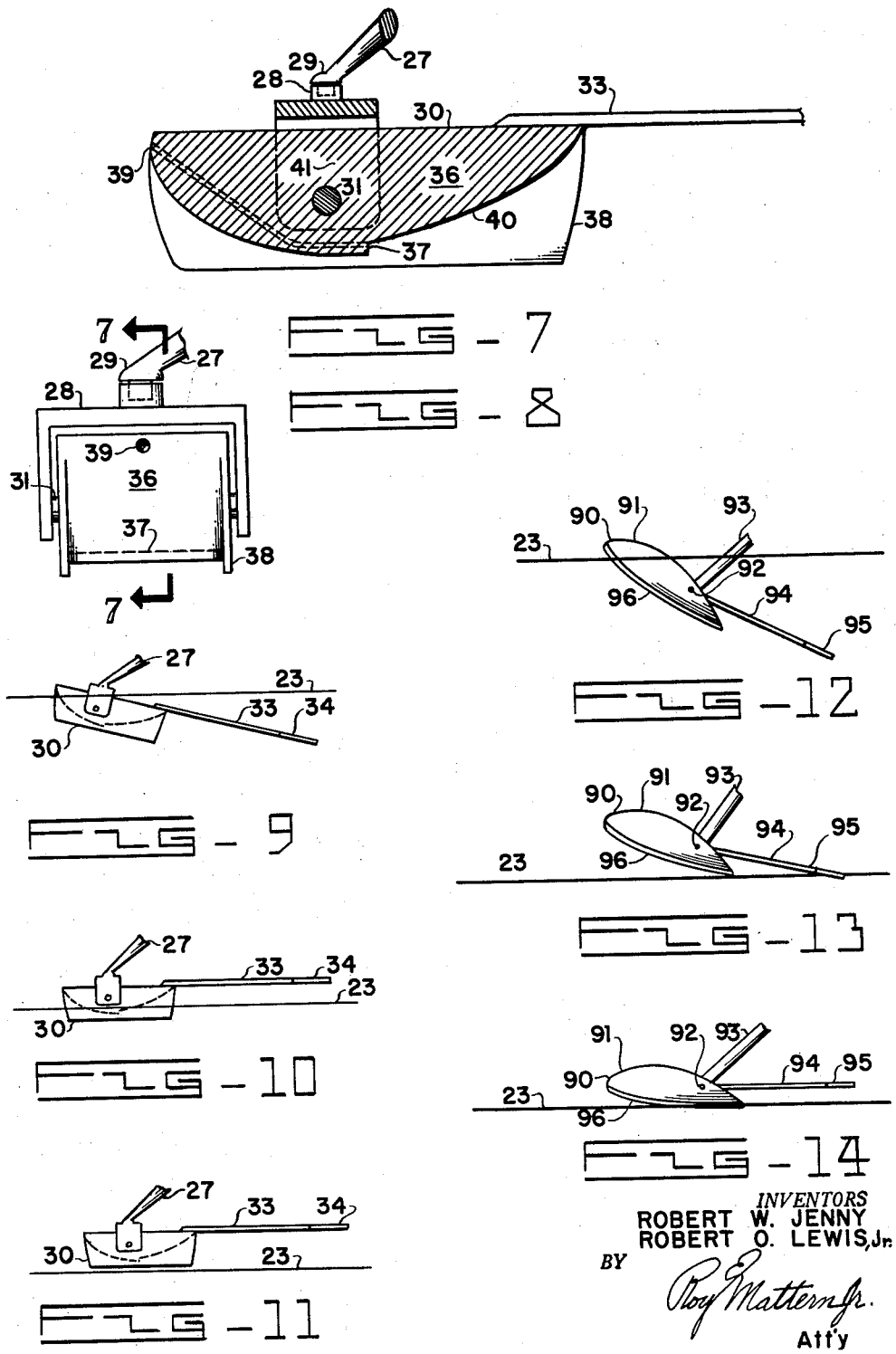

| United States Patent Office | 3,145,954
Patented Aug. 25, 1964 |
|---|---|

3,145,954
VEHICLE FOR NON-AIR, SEMI-AIR, AND
FULL-AIR SUPPORTED TRAVEL
Robert W. Jenny, 10441 SE. 24th Place, and Robert O.
Lewis, Jr., 6007 Hazelwood Lane, both of Bellevue,
Wash.
Filed Mar. 7, 1962, Ser. No. 178,136
7 Claims. (Cl. 244—105)

This invention relates to vehicles and more particularly to those vehicles traveling over surfaces having the uniformity of water surfaces, and in the embodiment shown the invention is a marine vehicle for travel at the water's surface, commencing and terminating a trip supported by the buoyant water forces, intermittently being supported simultaneously by both buoyant and ram forces of both water and air, and ultimately at the higher speeds being supported by the forces of air alone when at all times being propelled by the forward thrust generated by a self contained power plant.

The purpose of the invention is to provide a vehicle for travel over surfaces at compartively high speeds for the energy that is required and expended, and for safe travel at such high speeds by the provision of inherent stabilizing means.

For many years inventors have disclosed new surface vehicles directed to providing better transportation at higher speeds and at lower cost for handling both passengers and freight. In respect to water craft there have been improvements in hull designs per se, in hydrofoils and more recently in air cushion configurations. In respect to land vehicles there have been improvements in body designs per se, and likewise more recently in air cushion configurations. In regard to both water craft and land vehicles these mentioned improvements have been achieved with airfoils in several vehicles.

An example of such a vehicle is the water craft disclosed by Greg in his United States Patent Number 2,139,303 wherein FIGURE 5 airfoils are shown as the supporting means, 2′, of dynamic nature and as directional control means, 4.

The invention to be described herein is considered to be a vehicle which incorporates the best features of these past vehicles and in addition utilizes dynamic and stabilization means in such a way that a vehicle for high speed, low cost travel is made available to the general public, providing a mode of travel that is safe, efficient and not dependent on the high skill of an operator. Moreover, the invention provides such a vehicle that will be operable under all or substantially all weather conditions.

The illusarated vehicle, depending on the speeds attained, functions at various times as a displacement boat, planing boat, hydroplane craft, hydroski boat and/or ram-air cushion craft. This occurs, because as the speed of the vehicle increases, the surface supports are decreased.

The invention will be better understood upon reading the following description of an embodiment particularly adapted for over water surface travel as illustrated in the accompanying drawings wherein:

FIGURE 2 is a front view of the water craft shown in FIGURE 1,

FIGURE 3 is a top view of the water craft shown in FIGURE 1,

Figure 1:
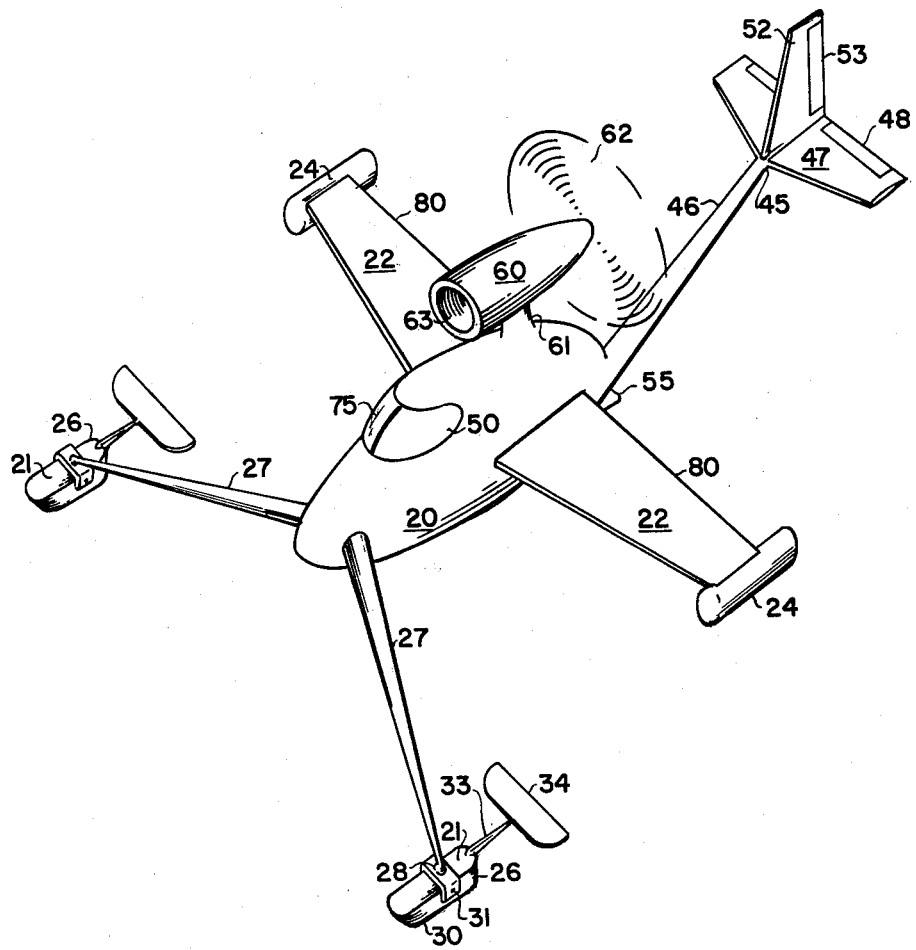
FIGURE 1 is a perspective view of the vehicle serving as a water craft.
Figure 4:
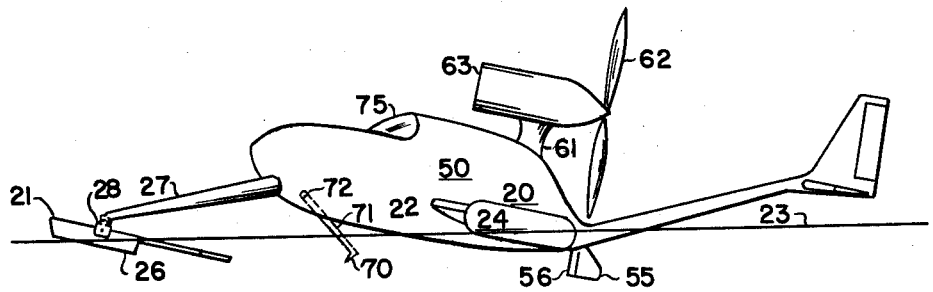
Figure 5:
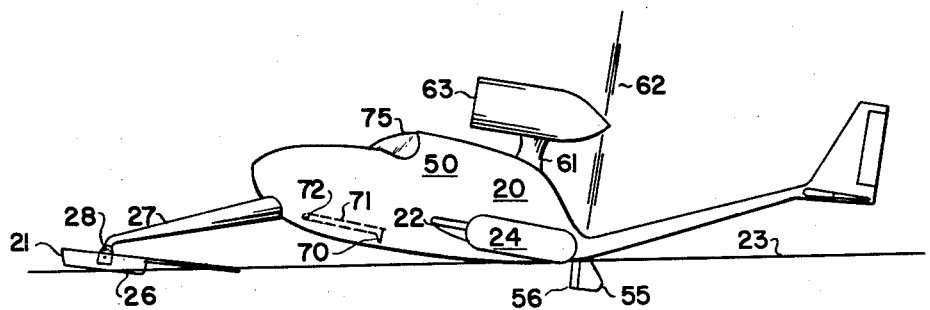
Figure 6:
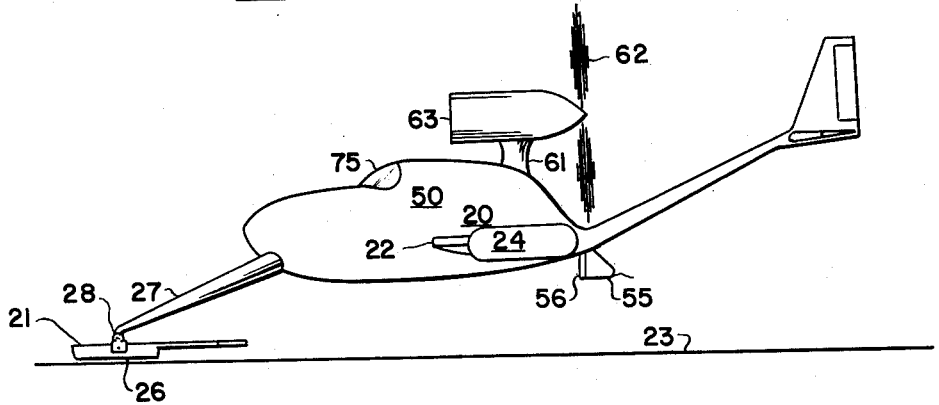

FIGURE 4 is a side view of the water craft shown in FIGURE 1 depicting a displacement hull mode of travel, FIGURE 5 is a side view of the water craft shown in FIGURE 1 illustrating a planing hull mode of travel, FIGURE 6 is a side view of the water craft shown in FIGURE 1 revealing the subtsantially airborne mode of travel, FIGURE 7 is a sectional view of one of the front stabilizing assemblies of the water craft shown in FIGURE 1, taken on line 7—7 of FIGURE 8, FIGURE 8 is a front view of the front stabilizing assembly shown in FIGURE 7, FIGURES 9, 10 and 11 show in side view the respective positions of the front stabilizing assembly shown in FIGURE 7 as the assembly itself experiences the modes of travel: displacement, planing, and airborne, FIGURES 12, 13 and 14 are similar to FIGURES 9, 10 and 11, but another embodiment of the front stabilizing assembly is illustrated.

As noted in FIGURE 1, the vehicle does in many respects at first glace resemble an airplane equipped with floats. Additional consideration, however, especially with respect to FIGURES 4 and 5 reveals that the floats 21 are not large enough to keep the body, fuselage or hull 20 completely out of the water when at rest and at low speeds. Consequently, the body 20 must incorporate both aerodynamic and hydrodynamic surfaces and structures and is called an aero-marine body, fuselage or hull 20.

This body 20 serves as the payload carrying means for personnel, baggage, freight and the on board supplies and equipment required to operate the vehicle. Also it serves as the main structural member supporting all the other components of the vehicle.

Likewise, further consideration of the FIGURES 1 through 6 indicates that the wings 22, being relatively small, cannot support the vehicle in a free air airborne mode of travel at a considerable distance above any surface. This of course is true and accounts for the low placement of the wings 22 on the body, fuselage or hull 20. In such a position the wings 22 integrate and utilize the increase in air pressure as this occurs between the wings 22 and the water surface 23.

At rest and at low speeds the wings 22 with tip floats 24 are partially submerged to add to the positive displacement of the vehicle supplementing the hull 20 displacement until the dynamic forces are created and increased sufficiently. Also the wings 22 furnish low speed lateral water stability. Consequently, the wings 22 are designed to withstand certain hydrodynamic loads as well as aerodynamic forces.

The next variance that might be noticed upon closer inspection of the craft illustrated in FIGURE 1 in contrast to an airplane with floats, centers on the forward stabilizing assemblies 26 of which there are two, one starboard and one port, both spaced forward and away from the fuselage, hull or body 20 on struts 27. As mentioned previously, they are small in comparison to floats designed for the complete support of an aircraft and furthermore the stabilizing assemblies are much too far forward to solely support the fuselage. With respect to this water craft the assemblies are essentially and primarily constructed to perform stabilizing functions throughout all modes and corresponding speeds of travel, by direct action in and upon the water and eventually at high speeds solely by ram air action. By their placement the stabilizing benefits are realized about both the lateral and horizontal axes of the vehicle.

The forward stabilizing assemblies 26, for example, can and should be mounted to the struts 27 so there is relative angular movement between them and the struts 27. This is accomplished by a controlled pivot mounting of a yoke 28 at 29 to the strut 27 and thereafter pivotally mounting the stabilizer sponson 30, itself, to the yoke 28 on the horizontal shaft 31. In this way relative motion is possible in two planes, lateral and horizontal.

Extending rearwardly from each stabilizer sponson 30 of each stabilizing assembly 26 is a cantilever arm 33 supporting a sponson damping stabilizer 34. As the sponson 30 oscillates in its travel through, on and over the water, the aerodynamic stabilizer 34 is available to dampen the oscillations that otherwise might increase to detrimental proportions. The damping stabilizer 34 tend toward arriving at a neutral position at the high cruise speeds of the vehicle.

The preferred design of the stabilizer sponsons 30 is illustrated throughout FIGURES 1 through 11. The details of such design are best depicted in FIGURES 7 and 8. The central core of the sponsons is a small negative lift producing inverted wing 36 equipped with a marine step 37, side plates or curtains 38 quite rectangular in configuration, and a ram air tube 39 to conduct air to the vicinity of marine step 37 to eliminate negative hydrodynamic loading below the stabilizing sponson 30.

The center of gravity of the stabilizing assembly 26 is located at 40 and when submerged in part and at rest the center of buoyancy is at 41. At a result, the assembly 26 varies in its position essentially with speed changes as illustrated in FIGURES 9, 10 and 11. As the operation of the vehicle commences, the stabilizing assembly 26 climbs out of the water from its position shown in FIGURE 9 to the position shown in FIGURE 10, and upon reaching very high speeds, the assembly 26 lifts off the water surface as illustrated in FIGURE 11, in the same manner as the wings 22.

Additional horizontal stabilizing components are to be found in the plane-like tail assembly 45 mounted on a boom-like extension 46 of the body, fuselage or hull 20. There are horizontal tail stabilizers 47 which are shown with control trim tabs 48. These stabilizers acting at considerable distance to the rear of the center of gravity 50 of the entire vehicle smooth the overall riding qualities and serve as a safety check to prevent flip over of the vehicle.

The tail assembly 45 may have a vertical stabilizer 52 and rudder 53 for high speed stability and directional control. Low speed directional control is accomplished by the pivoting of the hull rudder 55 about its mounting 56. Both of these directional controls could be eliminated or supplemented. For example, the thrust producing unit 60, not mentioned previously, could be mounted for movement relative to the fuselage, body or hull 20 eliminating the need for such directional control devices as the tail rudder 53 and/or the hull rudder 55.

The thrust producing unit 60, however, is shown as a permanently mounted power plant pod located above the fuselage 20 on the pod support 61 to the rear of the center of gravity 50 and above the wings 22. For purposes of illustration, the power plant is shown equipped with a propeller 62 and the engine air intake is located at 63. A pure turbojet engine might be used, or the power plant could be relocated for the use of a water propeller as the driving means (not shown).

As indicated in FIGURES 4, 5, and 6 more rapid stopping of the vehicle is accomplished by lowering a braking foil 70 into the water as its strut arm 71 is pivoted about a fuselage or hull hinge 72.

The operator of the vehicle views the course ahead through the windshield 75, and just inside the fuselage or hull 20 adjacent to and below the windshield 76 the operator or pilot's controls (not shown) are located. As a minimum, such controls are for operating the power plant as well as the braking, directional and trim devices.

Further discussion of the components of the vehicle, as illustrated throughout FIGURES 1 through 11 is best undertaken in reference to the vehicle's entire operation. In FIGURE 4, the vehicle is shown with its hull 20 and its other components in maximum water displacement status which occurs when the vehicle is at rest and traveling at slow speeds. In this slow speed position all the submerged portions of the forward stabilizing assemblies 26, the hull 20, the wings 22, and the tip floats 24 are oriented for climbing out of the water upon the increase in speed. The dynamic forces on the wings 22 immediately commence to increase and to replace progressively the water buoyant forces as the vehicle goes faster.

As the vehicle lifts out of the water, the forward stabilizing sponson 30 and the aero-marine hull 20 assume a planning attitude on the water as shown in FIGURE 5, and the remainder of the vehicle is clear of the water. At this time many of the advantages of this embodiment of the invention are being realized and the increase in speed occurs without a large demand for additional forward thrust.

As indicated in FIGURE 6, under somewhat favorable weather and sea conditions and with the slightly increased thrust, the vehicle will eventually ride just above the water surface while supported essentially aerodynamically, except for an occasional water contact necessitating readjustment of the forward stabilizing assembly.

This ultimate cruising condition is maintained because the vehicle incorporates inherent stabilizing forces which act about the pitching axis of the sponson, the pitching axis being located substantially laterally through the struts 27 at 29.

An analysis of the various forces and their couples follows. There are two sets of force couples tending to keep the stabilizing assemblies 26 down. One is the force couple formed by the upwardly directed wing lift, which as will be discussed later is subject to variation, and the downward weight of the vehicle itself. The other is the force couple formed by the forwardly directed thrust of the power plant and the rearwardly directed drag of the vehicle.

About the center of gravity 50 of the vehicle, the lifting forces of the stabilizing sponsons 30 and the fuselage 20 combine to render a clockwise summation of moments, whereas the forces of the wing 22, tail stabilizer 47 and the drag-thrust couple combine to render a counter clockwise summation of moments.

Throughout FIGURES 1 through 11, the wings 22 and the sponson-wing body 36 are shown in inverted wing configurations. When the center of thrust is high as shown and under certain high speed conditions, the thrust drag moment exceeds the moment of the vehicle mass about the pivot point 31. Under this condition the vehicle would tend to continue to rise above the water. This continued rise alters the angle of attack of the wing so that it generates a downward force acting about pivot 31, opposing the thrust drag couple, thereby reversing the tendency of the vehicle to rise further above the surface. This downward force on the wing is supplemented by a decreased force under the wing caused by the decrease of the ram air pressure due to the increase of the gap between the wing and the water. Both of these downward forces are achieved more efficiently and quickly with the wings 22 inverted as shown rather than in the normal aircraft configuration.

When the weather conditions are becoming marginal for any watercraft, the forward stabilizing assemblies will be undergoing continuous shocks as intermittent contacts are made with the water. These shocks are lessened by the sponsons 30 design and its accompanying airfoil stabilizer 34. In this way the stabilizing assemblies 26 continue to provide a fulcrum for the adjustment of the angle of attack of the wings 22.

In rough weather operation the sponson-stabilizing assemblies will not respond in the vertical direction to relatively small surface irregularities but will respond to waves which are large relative to the size of the craft.

As these stabilizing assemblies rise, the vehicle is rotated about the center of gravity in the pitch plane causing the angle of attack of the wing to increase, in turn causing increased lift. The lift causes the craft to climb the wave. As the stabilizers descend the wave, the opposite action occurs. In this manner the craft inherently follows the contour of the larger waves.

This variation in angle of attack of the wing by rotation of the vehicle about the stabilizing assemblies as points of support also serves to establish equilibrium after changes in thrust and/or loading of the craft. For example, at lower thrust and therefore lesser speed, the aerodynamic lift first decreases, however, the settling of the vehicles mass toward the water surface soon increases the angle of attack until the aerodynamic lift again equals that portion of the vehicles mass supported by the wing. Conversely, increase in thrust first would increase speed and therefore the areodynamic lift, however, the increased aerodynamic lift would raise the vehicle mass causing a decrease in angle of attack thereby adjusting the aerodynamic lift to again equal that portion of the vehicle's mass supported by the wing. At times the thrust could possibly increase to the point where the angle of attack will become negative causing the wing to generate downward (negative) force, helping to bring the force system into equilibrium.

In the vent of submergence of the sponsons 30 resulting in the pitching of the vehicle, the negative lift generated by the wing combined with the damping action of the stabilizer 34 will quickly help to control the pitching moments which might otherwise result in the vehicle flipping over, before the sponsons 30 were running free again.

For these reasons, the embodiment of the invention presented in the drawings with respect to the main wings 22 utilizes the inverted wing profile. It is recognized, however, with somewhat different arrangements of the thrust producing power plants where, for example, the line of thrust could be underwater, the importance of an inverted wing profile may be minimized even to the extent of substantially eliminating the inversion aspects.

Even with the high thrust line as illustrated in the drawings, it is recognized that the forward stabilizing assemblies 26 could employ sponsons other than those shown throughout FIGURES 1 through 11 which incorporated the inverted wing profile. For this reason FIGURES 12, 13 and 14 are presented to illustrate what might properly be termed a ski sponson assembly 90. Each sponson 91 is pivotally mounted at shaft 92 to a fuselage strut 93, similar to the struts 27 noted previously. To complete the assembly there are again cantilevered arms 94 supporting ski damping stabilizers 95. Also the bottom of each ski sponson 91 is equipped with a keel 96 which is useful to reduce shock tendencies upon water contact and to stabilize the direction of ski sponson 91. The three FIGURES 12, 13 and 14 like the FIGURES 9, 10 and 11 illustrate, respectively, the maximum displacement position, the planing position and the high speed position of the ski sponson assemblies 90.

It is preferred, however, when utilizing the invention in a design of a vehicle for travel over water that the embodiment illustrated in FIGURES 1 through 11 be followed so that higher speeds are attainable with the maximum safety. The low placement of an inverted wing partially in and near the water results in: optimum aerodynamic efficiency, minimum induced drag, tighter stabilization about the pitch axis with the least expenditure of energy, and sufficient buoyancy and stability both at lows speeds and at rest.

All these advantages of this low inverted wing embodiment combined with the advantages of both the forward sponson stabilizers and the rear tail stabilizer make the vehicle in operation smooth riding, comfortable and safe for the crew and passengers.

With the coming of improved land surfaces, the invention could be embodied in a vehicle designed for over land travel. The body 20 and the forward stabilizing assemblies 26 would necessarily be provided with rotatable members (not shown) but the balance of the embodiment could remain substantially unchanged, especially where amphibious operations for the vehicle were a necessity.

We claim:

1. A marine, land and amphibious vehicle for high speed travel over surfaces having the uniformity of water surfaces, traveling at such high speeds in an airborne status in reliance on the maintenance of ram air lift, at intermediate speeds on a semi airborne status in reliance on the maintenance of both lower ram air lift and contact with the surface of at least one forward stabilizer, and at low speeds in reliance on the maintenance of the contact with the surface of at least one forward stabilizer and at least one rear portion of the vehicle, such vehicle comprising a body, inverted wing sustaining members supported by the body and extending laterally from the body aft of the center of gravity of the vehicle, inverted wing stabilizing means forward of the center of gravity of the vehicle for running on or clear of the surface, stabilizing means aft of the center of gravity of the vehicle remaining at all times above the surface, directional control means and thrust producing means both mounted on the vehicle.

2. A vehicle for traveling over and close to surfaces having the characteristics of water surfaces, comprising: an intergrated structure including negative lift inverted wings extending laterally and located so the forces associated with the wing act aft of the center of gravity of the integrated structure of the vehicle, the wings being smaller than required for free air flight at comparable speeds, and stabilizing means sensing the location of the surface in front of the vehicle, the stabilizing means acting in cooperation with the inherent operational characteristics of the vehicle.

3. A marine, land and amphibious vehicle for high speed travel over surfaces having the uniformity of water surfaces, traveling at such high speeds in an airborne status in reliance on the maintenance of ground effect and ram air lift, at intermediate speeds on a semi airborne status in reliance on the maintenance of both lower ram air lift and contact with the surface of at least one forward stabilizer, and at low speeds in reliance on the maintenance of the contact with the surface of at least one forward stabilizer and at least one rear portion of the vehicle, such vehicle comprising an elongated streamlined body, thrust producing means mounted on the body, directional control means mounted on the body, inverted wing sustaining members supported by the body and extending laterally from the lower portions of the body at a location aft of the center of gravity of the body in a position to create ram air lift forces, inverted wing sponsons serving as vehicle stabilizers positioned well forward of the center of gravity of the vehicle, substantially non movable struts forwardly extending on a downward bias and permanently positioned on the forward portions of the body and multidirectionally pivotally supporting the forward inverted wing sponsons serving as vehicle lateral and longitudinal stabilizers as the sponsons run both on and clear of the surface, clearing the surface as the vehicle speeds are increased causing higher ram air pressures to occur between the inverted wing of the sponsons and the surfaces over which the vehicle is traveling, the inverted wing contours of both the sustaining members and stabilizing sponsons arranged to create negative lift that is constantly available to monitor the ram air lift forces so the sponsons will remain on or near the surface serving both as sensing and fulcrum points for the follow on movements of the body and so the inverted wing members will move only within the tight operational system of the vehicle wherein the sustaining wing members remain in an operating range of positions at cruising and high speeds spaced above the surface traveled over.

4. A marine vehicle supported both at rest and at low speeds by the buoyancy of water, and supported at intermediate speeds by dynamic forces of both water and air, and supported at high speeds by the dynamic forces of air, comprising: an aeromarine fuselage serving as the structural body of the vehicle to receive all directional, propulsion, braking and lift control means; lateral extending aeromarine negative lift inverted wing members mounted low on the aeromarine fuselage, aft of the center of gravity of the marine vehicle; forward, lower and lateral pivotal negative lift inverted wing stabilizing sponsons serving as the transverse fulcrums of the entire marine vehicle strut mounted to the bow of the aeromarine fuselage; rear anti pitch control stabilizers attached to the aeromarine fuselage; an aerodynamic directional control means pivotally mounted on the fuselage; hydrodynamic directional control means pivotally mounted on the fuselage, and a thrust producing power plant installed on the fuselage.

5. A vehicle for traveling over surfaces having comparable surface contours to water surfaces under various weather conditions, comprising a body elongated in the direction of the principal heading of the traveling vehicle, an inverted wing structure supported at a low position on the body in a location aft of the center of gravity of the vehicle, the wing structure being of an effective surface area that is less than the area required to create lifting forces for powered flight of the vehicle well above the surface to be traveled over, a pair of substantially rigid body mounted struts extending on a bias forwardly downwardly and outwardly from the body, inverted wing sensors pivotally mounted about dual axes to the lower ends of the respective struts, sensor damping stabilizers mounted at the rear of each sensor, aerodynamic horizontal stabilizers and a directional control rudder mounted on rearwardly extending portions of the body, a main propulsion unit mounted on the body both above and aft of the inverted negative lift wing structure, and surface contacting means provided on the sensors, body and wing structure.

6. A marine vehicle for travel at all speeds and while traveling at higher speeds being capable of traveling entirely just above the surface, comprising an elongated hull supporting:
 (a) wing sustaining members extending laterally from the hull aft of the center of gravity of the marine vehicle at a position low enough to be partially submerged in the water at low speeds providing both lateral stability and water buoyancy and to be just above the water at intermediate and high speeds to create ram air lift effective in raising and keeping the hull out of the water;
 (b) stabilizing means forward of the center of gravity of the marine vehicle partially submerged at low speeds, and essentially running on or clear of the water's surface at higher speeds;
 (c) stabilizing means aft of the center of gravity of the marine vehicle remaining at all times clear of the water's surface;
 (d) directional control means;
 (e) a thrust producing means; and
 (f) a hydrodynamic brake pivoted from the hull without destroying the watertight integrity of the hull, for operation at any speed to produce a retarding force.

7. A marine vehicle for travel at all speeds and while traveling at higher speeds being capable of traveling entirely just above the surface, comprising an elongated hull supporting:
 (a) wing sustaining members extending laterally from the hull aft of the center of gravity of the marine vehicle at a position low enough to be partially submerged in the water at low speeds providing both lateral stability and water buoyancy and to be just above the water at intermediate and high speeds to create ram air lift effective in raising and keeping the hull out of the water;
 (b) stabilizers forward of the center of gravity of the marine vehicle partially submerged at low speeds, and essentially running on or clear of the water's surface at higher speeds, each stabilizer being a sponson of inverted wing configuration equipped with end curtains, ram air intakes, and trailing cantilever supported airfoil stabilizers, all, as an assembly, pivotally secured to a strut that is in turn substantially firmly mounted on the hull;
 (c) stabilizing means aft of the center of gravity of the marine vehicle remaining at all times clear of the water's surface;
 (d) directional control means; and
 (e) a thrust producing means.

References Cited in the file of this patent

UNITED STATES PATENTS

| | | |
|---|---|---|
| 1,901,357 | Raulerson et al. | Mar. 14, 1933 |
| 2,139,303 | Greg | Dec. 6, 1938 |
| 2,347,959 | Moore | May 2, 1944 |
| 2,795,202 | Hook | June 11, 1957 |
| 2,844,339 | Stroukoff | July 22, 1958 |

FOREIGN PATENTS

| | | |
|---|---|---|
| 55,658 | Switzerland | Mar. 2, 1911 |